United States Patent
Johnson et al.

(10) Patent No.: US 10,558,528 B2
(45) Date of Patent: *Feb. 11, 2020

(54) RECONSTRUCTION OF SYSTEM DEFINITIONAL AND STATE INFORMATION

(71) Applicant: International Business Machines Corporation, Armonk, NY (US)

(72) Inventors: Brian Johnson, Winchester (GB); Mark W. T. Todd, Winchester (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 287 days.

This patent is subject to a terminal disclaimer.

(21) Appl. No.: 15/788,693

(22) Filed: Oct. 19, 2017

(65) Prior Publication Data

US 2018/0039545 A1 Feb. 8, 2018

Related U.S. Application Data

(63) Continuation of application No. 13/611,705, filed on Sep. 12, 2012, now Pat. No. 9,836,353.

(51) Int. Cl.
*G06F 11/14* (2006.01)
*H04L 29/08* (2006.01)

(52) U.S. Cl.
CPC .......... *G06F 11/1435* (2013.01); *H04L 67/06* (2013.01); *H04L 67/1097* (2013.01)

(58) Field of Classification Search
CPC ............. G06F 11/0706; G06F 11/2069; G06F 11/1435
See application file for complete search history.

(56) References Cited

U.S. PATENT DOCUMENTS 4,648,031 A 3/1987 Jenner
5,471,615 A 11/1995 Amatsu et al.
(Continued)

FOREIGN PATENT DOCUMENTS

EP 1968301 A2 9/2008
WO 2008116731 A1 10/2008

OTHER PUBLICATIONS

United States Patent and Trademark Office, Office Action for U.S. Appl. No. 13/611,705, dated Jul. 21, 2014, pp. 1-35, Alexandria, VA, USA.
(Continued)

*Primary Examiner* — Tamara T Kyle
*Assistant Examiner* — Jesse P Frumkin
(74) *Attorney, Agent, or Firm* — Tihon Poltavets

(57) ABSTRACT

A determination is made as to whether one of a system definition file data set and a catalog data set is unavailable for orderly restart of an information system. The system definition file data set provides resource definition information for the information system and the catalog data set provides resource state information for the information system. A determination is made that the other of the system definition file data set and the catalog data set is available. The unavailable one of the system definition file data set and the catalog data set is reconstructed by rebuilding the system resource definition and state information used by the unavailable one of the system definition file data set and the catalog data set using system resource information within the other available one of the system definition file data set and the catalog data set.

12 Claims, 5 Drawing Sheets

(56) References Cited

U.S. PATENT DOCUMENTS

| | | | |
|---|---|---|---|
| 5,613,111 | A | 3/1997 | Malatesta et al. |
| 5,625,815 | A | 4/1997 | Maier et al. |
| 5,630,133 | A | 5/1997 | Hotea et al. |
| 5,682,507 | A | 10/1997 | Phillips et al. |
| 5,790,868 | A | 8/1998 | Hotea et al. |
| 5,884,328 | A | 6/1999 | Mosher, Jr. |
| 7,016,917 | B2 | 3/2006 | Schreiber |
| 7,054,927 | B2 | 5/2006 | Ulrich et al. |
| 7,200,626 | B1 | 4/2007 | Hoang et al. |
| 7,958,393 | B2 | 6/2011 | Bobak et al. |
| 8,005,720 | B2 | 8/2011 | King et al. |
| 8,190,947 | B1 | 5/2012 | Holl et al. |
| 8,464,246 | B2 | 6/2013 | Davies et al. |
| 2005/0091233 | A1* | 4/2005 | Friske .............. G06F 11/1435 |
| 2005/0273557 | A1 | 12/2005 | Tabuchi et al. |
| 2007/0174655 | A1 | 7/2007 | Brown et al. |
| 2007/0260908 | A1 | 11/2007 | Mitchell et al. |
| 2009/0172460 | A1 | 7/2009 | Bobak et al. |
| 2009/0172470 | A1 | 7/2009 | Bobak et al. |
| 2010/0077255 | A1 | 3/2010 | Lehr et al. |
| 2011/0035724 | A1 | 2/2011 | Kettley et al. |
| 2013/0073897 | A1 | 3/2013 | Khmelnitsky |
| 2013/0159258 | A1 | 6/2013 | Belisle et al. |
| 2013/0297970 | A1 | 11/2013 | Callaway et al. |
| 2014/0074790 | A1 | 3/2014 | Berman et al. |
| 2014/0074795 | A1 | 3/2014 | Johnson et al. |
| 2014/0207739 | A1 | 7/2014 | Johnson et al. |
| 2015/0286535 | A1 | 10/2015 | Kushwah et al. |

OTHER PUBLICATIONS

Author Unknown, CICS Transaction Server for z/OS, CICS Transaction Server v2.3, Specification, Sep. 2009, pp. 1-17, IBM Corporation, Published online at: http://publib.boulder.ibm.com/infocenter/cicsts/v2r3/index.jsp?topic=/com.ibm.cics.ts23.doc/dfht2/dfht2kg.htm.

Anindya Banerjee, et al., Data Loss Prevention on Backup Data using Catalog and Index Information, IP.com Technical Disclosure IPCOM000217782D, May 11, 2012, pp. 1-4, Symantec Corporation, as cited within USPTO Office Action for U.S. Appl. No. 13/611,705, dated Jul. 21, 2014.

United States Patent and Trademark Office, Office Action for U.S. Appl. No. 13/611,705, dated Feb. 18, 2015, pp. 1-58, Alexandria, VA, USA.

Author Unknown, Essential Offers Arise II to Help Wise IBM MVS Virgins With Disaster Recovery, Computergram International, Nov. 1989, pp. 1-29, as cited within Office Action dated Feb. 18, 2015, for U.S. Appl. No. 13/611,705.

Janice McGinn, Essential Offers Arise II to Help Wise IBM MVS Virgins With Disaster Recovery, Computer Business Review, Nov. 1989, pp. 1-5, ComputerWire, Inc., USA.

United States Patent and Trademark Office, Office Action for U.S. Appl. No. 13/611,705, dated Aug. 10, 2016, pp. 1-52, Alexandria, VA, USA.

United States Patent and Trademark Office, Office Action for U.S. Appl. No. 13/611,705, dated Dec. 15, 2016, pp. 1-53, Alexandria, VA, USA.

United States Patent and Trademark Office, Notice of Allowance for U.S. Appl. No. 13/611,705, dated Jul. 25, 2017, pp. 1-43, Alexandria, VA, USA.

United States Patent and Trademark Office, Office Action for U.S. Appl. No. 14/219,122, dated Sep. 19, 2014, pp. 1-44, Alexandria, VA, USA.

United States Patent and Trademark Office, Office Action for U.S. Appl. No. 14/219,122, dated Feb. 12, 2015, pp. 1-40, Alexandria, VA, USA.

United States Patent and Trademark Office, Office Action for U.S. Appl. No. 14/219,122, dated Aug. 10, 2016, pp. 1-43, Alexandria, VA, USA.

United States Patent and Trademark Office, Office Action for U.S. Appl. No. 14/219,122, dated Dec. 16, 2016, pp. 1-43, Alexandria, VA, USA.

United States Patent and Trademark Office, Notice of Abandonment for U.S. Appl. No. 14/219,122, dated Aug. 4, 2017, pp. 1-2, Alexandria, VA, USA.

* cited by examiner

RECONSTRUCTION OF SYSTEM DEFINITIONAL AND STATE INFORMATION

BACKGROUND

The present invention relates to information systems. More particularly, the present invention relates to reconstruction of system definitional and state information.

Information systems, such as online information control systems, may utilize resource definitions that initially define configurations of system resources. These systems may also generate resource state data/information during system operation.

SUMMARY

A method includes determining, via a processor, that one of a system definition file data set and a catalog data set is unavailable for orderly restart of an information system, where the system definition file data set provides resource definition information and the catalog data set provides resource state information for the information system; determining that the other of the system definition file data set and the catalog data set is available; and reconstructing the unavailable one of the system definition file data set and the catalog data set by rebuilding the system resource definition and state information used by the unavailable one of the system definition file data set and the catalog data set using system resource information within the other available one of the system definition file data set and the catalog data set.

A system includes a memory and a processor programmed to: determine that one of a system definition file data set and a catalog data set is unavailable for orderly restart of an information system, where the system definition file data set provides resource definition information and the catalog data set provides resource state information for the information system; determine that the other of the system definition file data set and the catalog data set is available; and reconstruct within the memory the unavailable one of the system definition file data set and the catalog data set by rebuilding the system resource definition and state information used by the unavailable one of the system definition file data set and the catalog data set using system resource information within the other available one of the system definition file data set and the catalog data set.

A computer program product includes a computer readable storage medium having computer readable program code embodied therewith, where the computer readable program code when executed on a computer causes the computer to determine that one of a system definition file data set and a catalog data set is unavailable for orderly restart of an information system, where the system definition file data set provides resource definition information and the catalog data set provides resource state information for the information system; determine that the other of the system definition file data set and the catalog data set is available; and reconstruct the unavailable one of the system definition file data set and the catalog data set by rebuilding the system resource definition and state information used by the unavailable one of the system definition file data set and the catalog data set using system resource information within the other available one of the system definition file data set and the catalog data set.

DETAILED DESCRIPTION

Figure 1:
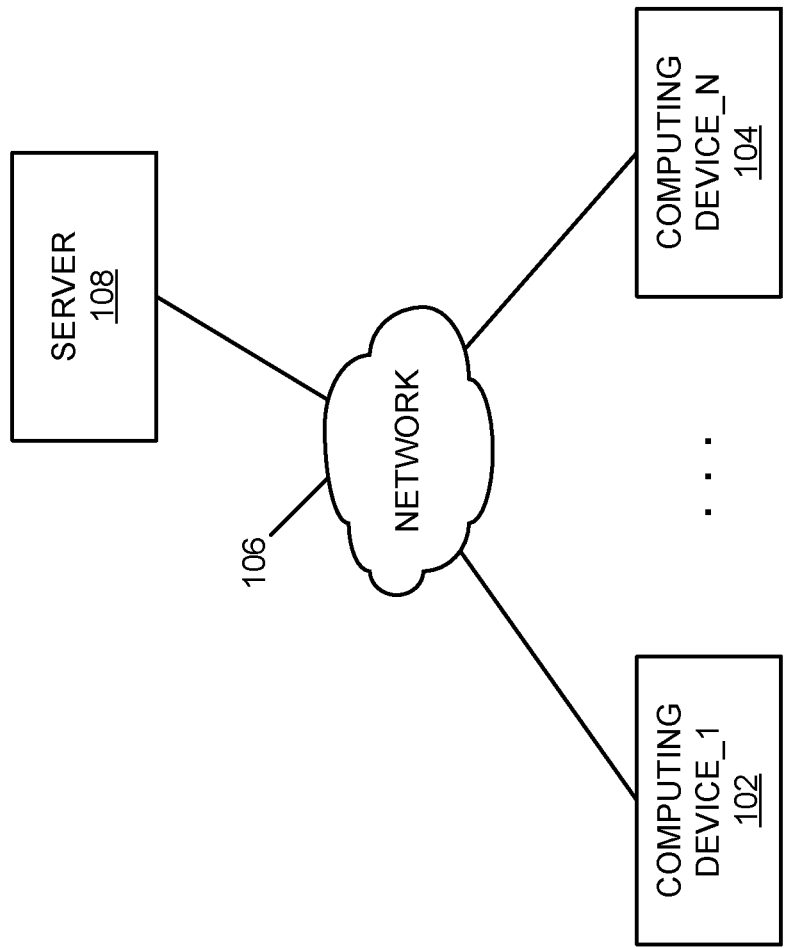
FIG. 1 is a block diagram of an example of an implementation of a system for reconstruction of system definitional and state information according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides reconstruction of system definitional and state information. The present technology provides automated recovery (or partial recovery) of a system data set, such as a system data set known in a customer information control system (CICS®) as the CICS® System Definition file (CSD), from information available on a catalog data set that includes last-updated state information for installed resources. As such, in the event of the loss of an original CSD, which would otherwise prevent any form of system restart, a warm restart of a system may be performed with a CSD that has a match with respect to resources that were cataloged at the end of the previous run. Similarly, a catalog data set may be generated that matches the settings of the CSD, and allow the system to start up with a view of the resource state that matched the resource state from the initialized settings of the resource data set. Accordingly, based upon the technology described herein, an information system customer/user may avoid the problem of a lost data set (e.g., either a CSD or catalog data set) by at least being able to warm restart their systems, and thereby plan a managed shut down and subsequent cold restart once the nature and extent of any system resource exposure as a result of the data set losses is determined. Additionally, diagnostic notifications may be generated that documents for the customer/user the various resources that were reconstructed by the present technology (e.g., the rebuilt system resource definition and state information) to assist with an off-line analysis and modification as appropriate for a given implementation.

For purposes of the examples described herein, it should be noted, regarding state information/data for resources that is generated during operation of an information system, such as a CICS® system, that some of the state data is internal to the product. This state data is managed directly by the system. As such, the lifetime of the internal state data is not dependent upon external influences.

In contrast, other items of state data are externalized, either via control blocks or via an application programming interface (API). These items of state data may have a lifetime that is dependent upon the users of the system, and may, in theory, persist indefinitely within the scope of a given instance of the system, or perhaps even across restarts of the system by being reconstructed from some external recovery media such as a system log or catalog data set.

Within the CICS® paradigm, an example of such a transient item of state data is a temporary storage queue. A temporary storage queue may be externalized via the CICS® API, and such queues may be written to (and may be implicitly created if not already in existence), may be read from, may be rewritten, and may be deleted. These temporary storage queues may be non-recoverable, and as such may be destroyed at the end of a CICS® system's run. Alternatively, temporary storage queues may be recoverable, and as such able to be reconstructed from the CICS® system log and rebuilt across restarts of the system. In this manner, temporary storage queues may persist for potentially long periods of time. A CICS® system may create temporary storage queues by using attributes from a "TSMODEL" resource definition, which is a template for producing temporary storage queues. Requests during operation are matched against the installed TSMODELs, and the TSMODEL with the best matching characteristics for the queue name in question is used as the template for creating the requested queue. This means that different queues are potentially created from different TSMODELs, depending upon the types of attributes specified for the different TSMODELs.

Although temporary storage queues are a specific CICS® example of transient state data, the same principle of extended lifetimes for such resources may be found in other implementations within the technology used to implement information systems, such as, for example, data held within relational tables in a database, entries held in a hierarchical data management system, records on a data set, and message data queued within a message queuing product, among other possible examples. The same principle of persistence applies to any such other examples of resources with transient state data, and it is understood that the present technology applies to any such other examples, as appropriate for a given implementation.

It should further be noted for purposes of the examples described herein that when an information system, such as CICS®, is shut down at the end of its run, one of the actions that the system performs is to record the current state of the resources. This recording of the current state of resources is different from committing their recovery data to synchronize the data integrity of the system. Committing recovery data involves hardening the data to the CICS® system log, which is provided for recovery purposes. For the purposes of resource state recording, the CICS® system writes the final state of its resources to a "catalog data set." This catalog data set is separate from the CSD data set. The catalog data set is read back when the CICS® system is "warm" restarted, so that the state of resources at the end of the previous run is restored. The catalog data set provides a mechanism to restore the system state to the existing characteristics of the end of the previous run, rather than when they were first installed into the system, because resources are not rebuilt from the CSD (as is done on cold restarts). As such, catalog data set processing provides for consistency between the state of the rebuilt resources (reconstructed from the CICS® catalog) and the recoverable state of their data (as reconstructed from units of work (UOWs) and system key point data on the system log).

It should be noted that conception of the present subject matter resulted from recognition of certain limitations associated with information systems. For example, it was observed that when an information system, such as a customer information control system (CICS®), is started up "cold," it creates initial entries (an initial state) for its various system resources (e.g., files, terminals, queues, programs, documents, etc.). The initial entries are definitions created from a system data set, known in a CICS® system as the CICS® System Definition file (CSD), using an application programming interface (API). It was additionally observed that, while these initial states may persist within the system address space as managed memory objects, certain operations (known as resource definition online (RDO) operations/data within a CICS® system) that occur while an information system is online/active may change the content/state of these resources and may also update the CSD to reflect these changes after the information system is initialized. For example, it was observed that programs may be enabled or disabled, queues may be made recoverable or non-recoverable, or files may be opened or closed. As these changes are made to the resources, the information system updates the respective resource's state within the associated control blocks that represent the objects held within memory for that runtime environment. It was further observed that, when such an information system is shut down at the end of its run in an orderly manner, one of the actions that the system performs is to record the current state of these resources, which is different from committing their recovery data, in order to synchronize the data integrity of the system (the latter involves hardening the data to the CICS® system log, which is provided for recovery purposes). For the purposes of resource state recording, an information system such as CICS® writes the final state of its resources to a "catalog data set," which is separate from the CSD data set. It was further observed that the catalog data set is read back in when the information system is "warm" restarted, so that the state of the resources at the end of the previous run is restored rather than placing system resources in the state at which they were first installed into the system. As such, it was observed that such processing avoids having to rebuild resources from the CSD once more (as is done on cold restarts). However, in view of these observations it was determined that, because the CSD and the catalog data sets may be physically represented on a direct access storage device (DASD), there is the potential for a hardware failure that corrupts or destroys the respective data sets, and a potential for system programmers or operators to inadvertently destroy or delete the content of the respective data sets. It was additionally determined that backups are not always available, or may themselves be subject to corruption or deletion, and that disaster recovery procedures may not be in place to adequately manage such situations. In such situations, it was determined that information system customers/users may experience problems with either the CSD data set or the catalog data set which would prevent a warm restart of the information system, and result in a loss of state information within their information system. For example, it was determined that, where the CSD is corrupted or non-existent, there is no way to restart the information system. Similarly, where the catalog data set is corrupted or non-existent, a warm restart is not possible and the only way to restart the information system is to start it cold from the initial state. The present subject matter improves information system restarts by providing for reconstruction of system definitional and state information, as described above and in more detail below. As such, improved information system maintainability may be obtained through the reconstruction of system definitional and state information described herein.

The present subject matter improves information system resource state preservation and fault-tolerant processing by implementing technology to reconstruct system definitional and state information. The present technology operates in response to a determination that a CSD is lost, corrupted, or deleted, using the catalog data set used by the CICS® system in question to reconstruct the CSD. The catalog data set may be parsed, and resource information may be extracted from the catalog data set. This extracted resource information may indicate the finalized state of the resources that had been cataloged when the CICS® system last ran and completed a warm shut down. Using this state data, the associated resource definitions may be reconstructed on a new copy of the CSD. These reconstructed resource definitions would reflect the finalized state of the resources, which may provide as close as possible a match to the original states of the respective resources. The CSD may then be made available to a restarted CICS® system. As such, a customer/user may bring up an information system once more and subsequently manage an orderly stabilization of the system under circumstances where a restart may otherwise be impossible. Accordingly, the present technology allows a customer/user to be able to continue to use the information system environment for those resources that would otherwise be lost. Additionally, a diagnostic notification (e.g., a message, warning, log, etc.) may be generated to document for the customer/user the various resources that were reconstructed in this manner (e.g., the rebuilt system resource definition and state information) to assist with any off-line analysis and modification as appropriate for a given implementation.

Similarly, the present technology operates in response to a determination that a catalog data set is lost, corrupted, or deleted, using the CSD data set used by the CICS® system in question to reconstruct a useable catalog data set. The CSD data set may be parsed, and resource information may be extracted from the CSD data set. This extracted resource information may indicate the final resource state of the resources that had been available to the CICS® system when it last ran. Using this state data, the associated catalog records may be reconstructed on a new copy of the catalog data set. These reconstructed catalog records would reflect the state of the resources, either in their finalized form when last installed into the CICS® system from the CSD, or using their initial values when the CICS® system opened the CSD on the previous cold startup and built the resources from the CSD. This processing may provide as close a match to the original states for resources as may be achieved under such circumstances. The catalog data set may then be available to a restarted CICS® system. As such, the customer/user may bring up an information system once more and subsequently manage stabilization of the system under circumstances where a restart may otherwise be impossible. Accordingly, the present technology allows the customer/user to be able to continue to use the information system environment for those cataloged resources that would otherwise be lost. Again, as with reconstruction of the CSD, where a catalog data set is reconstructed, a diagnostic notification (e.g., a message, warning, log, etc.) may be generated to warn the customer/user of the various resources that were reconstructed in this manner (e.g., the rebuilt system resource definition and state information) to assist with any off-line analysis and modification as appropriate for a given implementation.

It should be noted that an original CSD data set may have resources within it that are not utilized by an individual information system installation. As such, while reconstruction of a CSD from a single catalog data set for the particular system installation may yield a CSD useable by that particular system installation, additional logic may be provided for recovering a CSD from multiple catalog data sets across multiple regions. By reconstructing the CSD from multiple catalog data sets across multiple regions, a more comprehensive reconstruction of the original CSD may be performed. This may be used, for example, where a CSD is shared between multiple information system (e.g., CICS®) regions.

As such, when only a subset of the CSD definitions are installed on any one CICS® region, the recovery technology described herein may operate to recover resources for a CSD that is under reconstruction from multiple catalog data sets. This may be performed by iteration across the multiple respective catalog data sets of interest for the respective regions to recreate RDO data for additional resources that are not represented within a single catalog data set as installed on any one system. The sum of the resource data from the multiple catalog data sets may be utilized to reconstruct a more accurate CSD. For example, in such a situation, the processing for reconstruction of a CSD may be able to obtain more information from multiple grouplists, where each grouplist is associated with a particular installation of the information system. Accordingly, the use of multiple grouplists to extract different resources from different CICS® installations to reconstruct a CSD may yield a more comprehensive CSD.

In situations where a definition that is installed on multiple information systems has different states/attributes (e.g., open/closed state) in different regions, the logic may make a heuristic decision based upon the respective states in the multiple regions. For example, under such circumstances, states may be reset to a "lowest common denominator" among the respective set of states represented in the multiple catalog data sets.

Additionally, the associated warnings/diagnostics pertinent to such processing across multiple regions may document the respective decisions made during the automated reconstruction of system definitional and state information performed across the multiple catalog data sets. Other approaches to resolution of state differences across multiple regions are possible and all are considered to be within the scope of the present subject matter.

It should additionally be noted with respect to reconstruction of a catalog data set that the state of a particular resource may be inferred. For example, definitions of default resource run-time state values and value selection decisions for system resources may be established, and these definitions may be used to enhance resource state decision making during reconstruction of a catalog data set to account for typical installation state variations and to more accurately approximate the state of the respective resource in the lost catalog data set that is under reconstruction. As such, a more accurate reconstruction of a catalog data set may be performed by intelligent decision making with respect to state selection during catalog data set reconstruction.

The reconstruction of system definitional and state information described herein may be performed in real time to allow prompt reconstruction of definitional and/or state information for information systems. For purposes of the present description, real time shall include any time frame of sufficiently short duration as to provide reasonable response time for information processing acceptable to a user of the subject matter described. Additionally, the term "real time" shall include what is commonly termed "near real time"— generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for reconstruction of system definitional and state information. A computing device_1 102 through a computing device_N 104 communicate via a network 106 with a server 108. For purposes of the present examples, the computing device_1 102 through the computing device_N 104 may be considered client-type devices, while the server 108 may be considered either an application server or a transaction processing server. However, any other server appropriate for a given implementation may be used.

Any of the computing device_1 102 through the computing device_N 104 and/or the server 108 may provide reconstruction of system definitional and state information. As such and as will be described in more detail below in association with FIG. 2 through FIG. 4B, Any of the computing device_1 102 through the computing device_N 104 and/or the server 108 may provide automated reconstruction of system definitional and state information. The automated reconstruction of system definitional and state information is based upon utilization of one or more available catalog data sets to reconstruct a CSD and/or utilization of a CSD to reconstruct one or more catalog data sets. As such, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, smartphone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
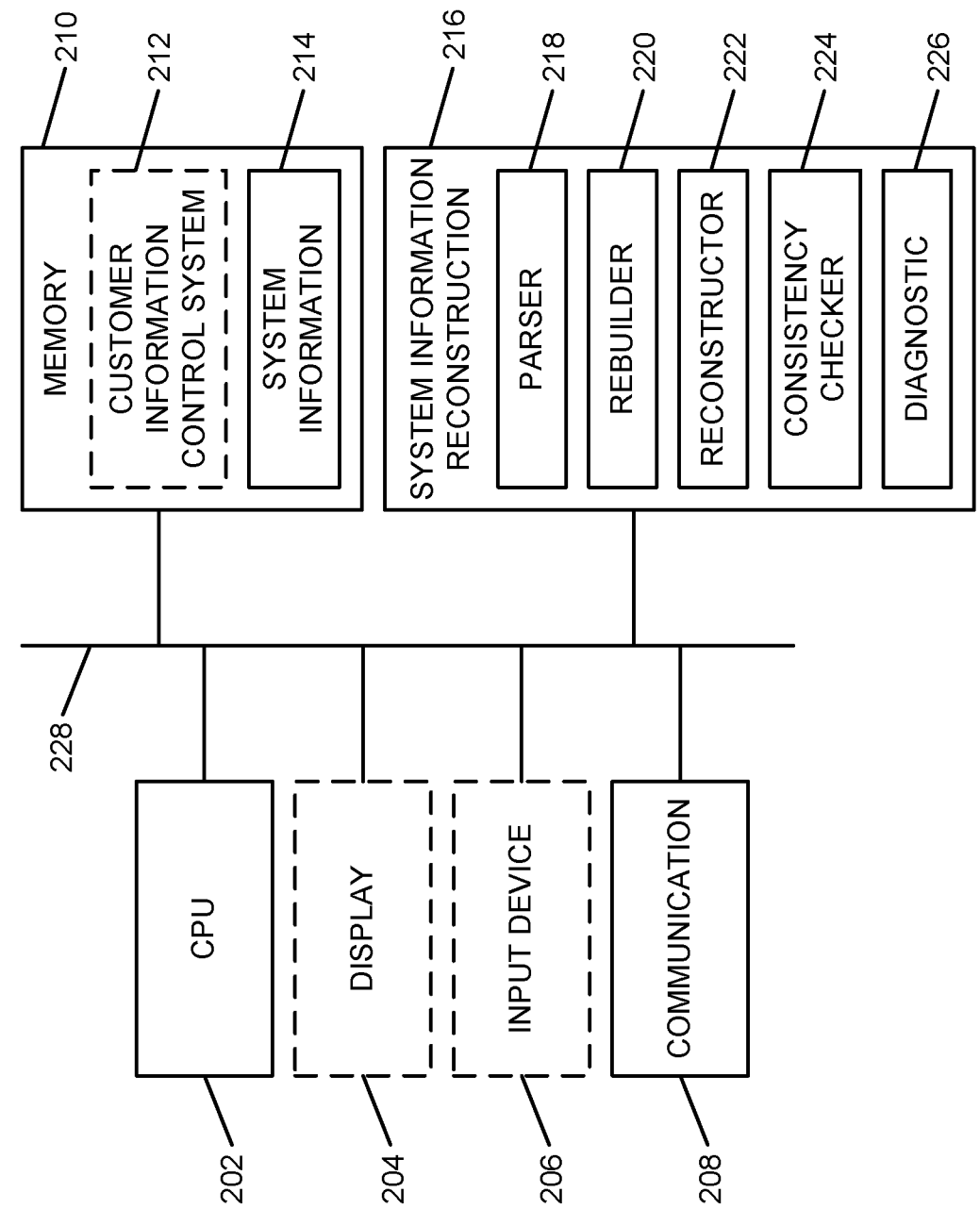
FIG. 2 is a block diagram of an example of an implementation of a core processing module capable of performing reconstruction of system definitional and state information according to an embodiment of the present subject matter.

FIG. 2 is a block diagram of an example of an implementation of a core processing module 200 capable of performing reconstruction of system definitional and state information. The core processing module 200 may be associated with either the computing device_1 102 through the computing device_N 104 or with the server 108, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for reconstruction of system definitional and state information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, as appropriate for a given implementation.

A memory 210 represents storage for application information, data, and other information for the core processing module 200. The memory 210 includes a customer information control system (CICS®) application area 212 that stores and executes a CICS® application for implementations of the server 108 that include transaction processing capabilities. The CICS® application area 212 is shown in a dashed-line representation to show that this area may exist for those implementations of the core processing module 200 that include transaction processing capabilities, such as at the server 108 when implemented as a transaction server.

The memory 210 also includes a system information storage area 214 that stores system information, such as one or more CSD data sets and one or more catalog data sets for use during runtime of the CICS® application. The system information stored within the system information storage area 214 may also be used, as described above and in more detail below, during reconstruction of system definitional and state information activities within core processing module 200. For example, default resource run-time state values and value selection decisions for system resources may be defined within the system information storage area 214, and this information may be used to infer state values for resources during reconstruction of catalog data sets and/or CSDs.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A system information reconstruction module 216 is also illustrated. The system information reconstruction module 216 provides analytical data processing capabilities within the core processing module 200, as described above and in more detail below. The system information reconstruction module 216 implements the automated reconstruction of system definitional and state information of the core processing module 200.

The system information reconstruction module 216 includes several components/modules that facilitate the processing performed by the system information reconstruction module 216. A parser module 218 reads the respective CSD or catalog data set, and extracts the appropriate records from the respective data set relating to the system resources and their initial or finalized states, respectively. A rebuilder module 220 defines a new instance of the respective lost, corrupted, or damaged data set(s). A reconstructor module 222 reconstructs the content of the respective lost, corrupted, or damaged data set(s) from the information extracted from the respective other of the CSD or catalog data set used to rebuild the respective catalog data set or CSD. A consistency checker module 224 ensures that the rebuilt data on the respective new data set reflects the environment as represented by the respective other of the CSD or catalog data set used to rebuild the respective catalog data set or CSD. A diagnostic module 226 generates diagnostics (e.g., a notification, log, etc.) to reflect what resources (e.g., the rebuilt system resource definition and state information) were affected by the reconstruction of the respective data set(s).

It should also be noted that the system information reconstruction module 216 may form a portion of other circuitry described without departure from the scope of the present subject matter. Further, the system information reconstruction module 216 may alternatively be implemented as an application stored within the memory 210. In such an implementation, the system information reconstruction module 216 may include instructions executed by the CPU 202 for performing the functionality described herein. The CPU 202 may execute these instructions to provide the processing capabilities described above and in more detail below for the core processing module 200. The system information reconstruction module 216 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the system information reconstruction module 216 are interconnected via an interconnection 228. The interconnection 228 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
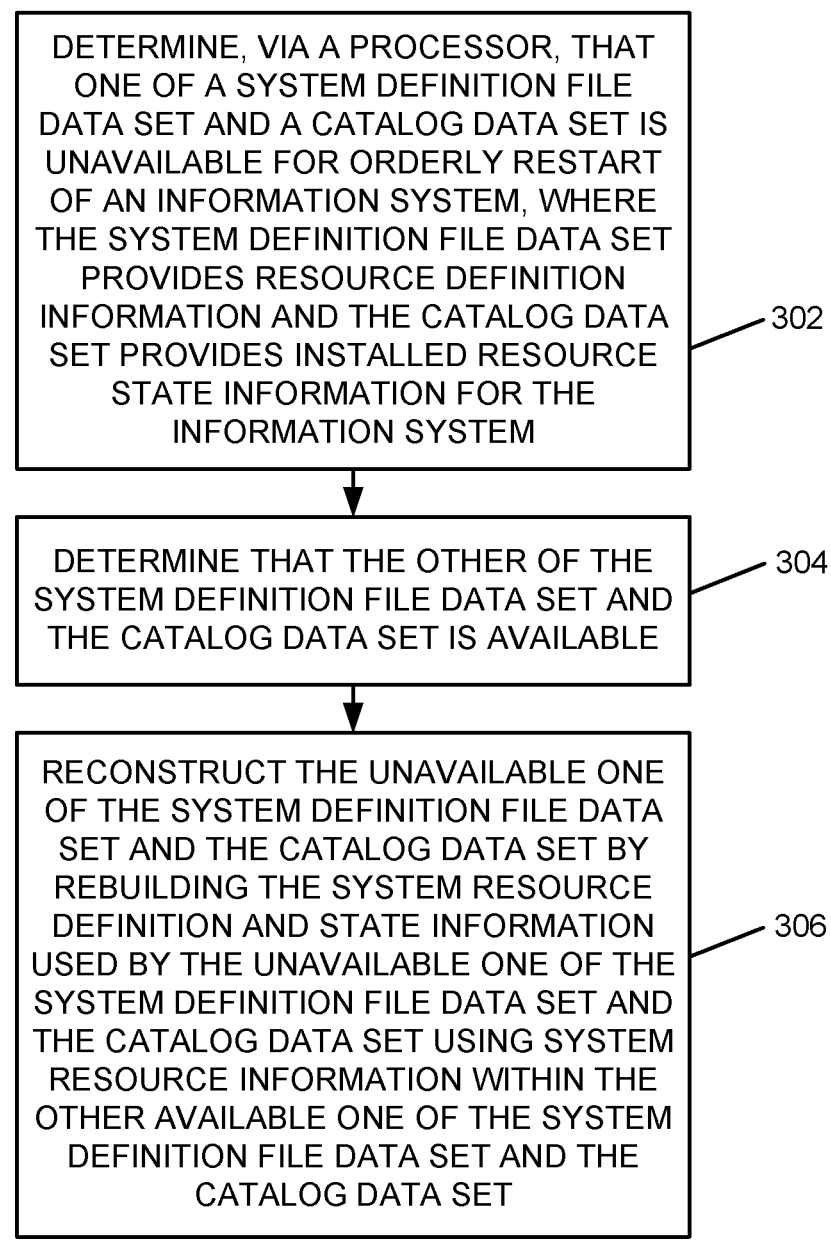
FIG. 3 is a flow chart of an example of an implementation of a process for reconstruction of system definitional and state information according to an embodiment of the present subject matter.
Figure 4A:
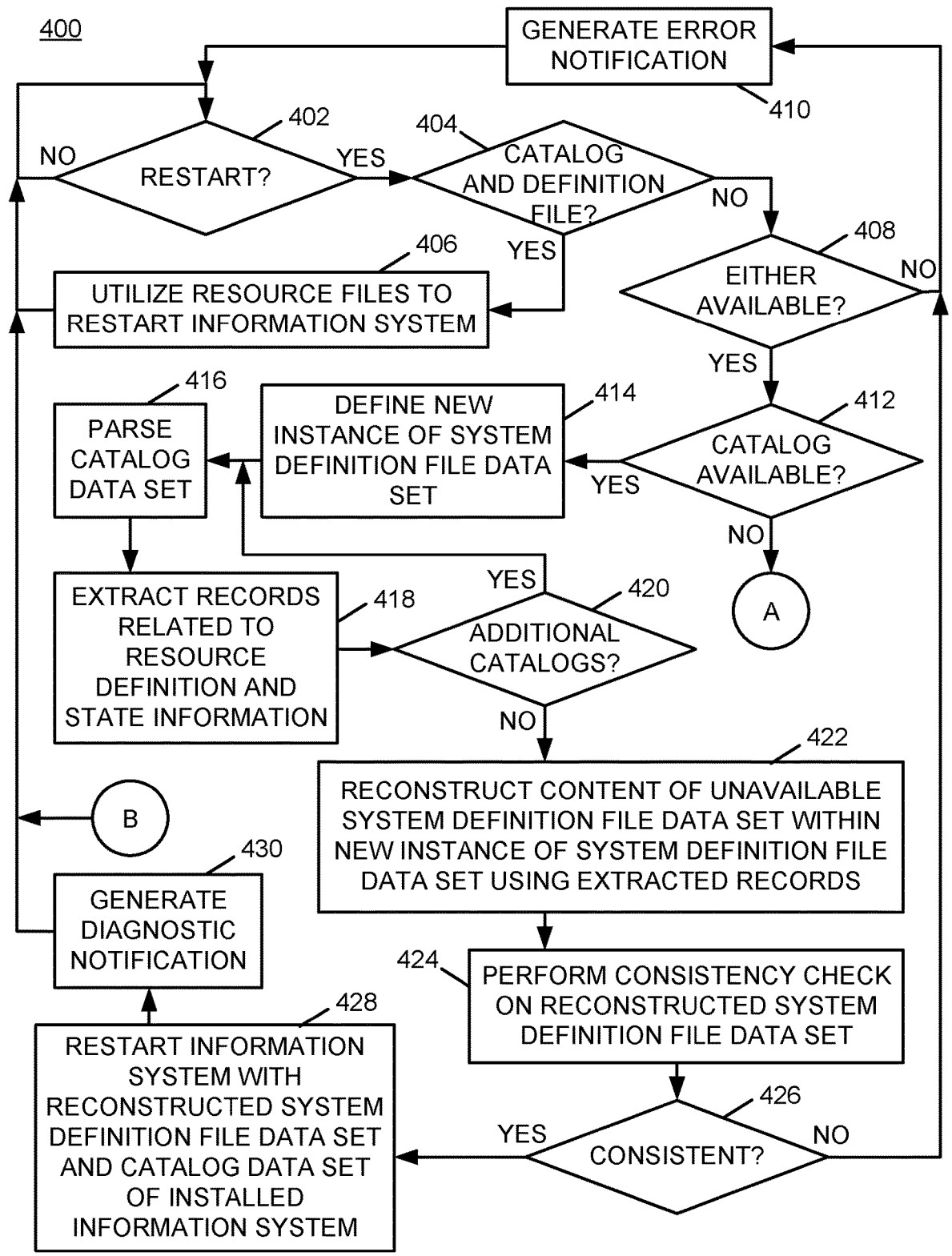
FIG. 4A is a flow chart of an example of an implementation of initial processing within a process for automated reconstruction of system definitional and state information according to an embodiment of the present subject matter.
Figure 4B:
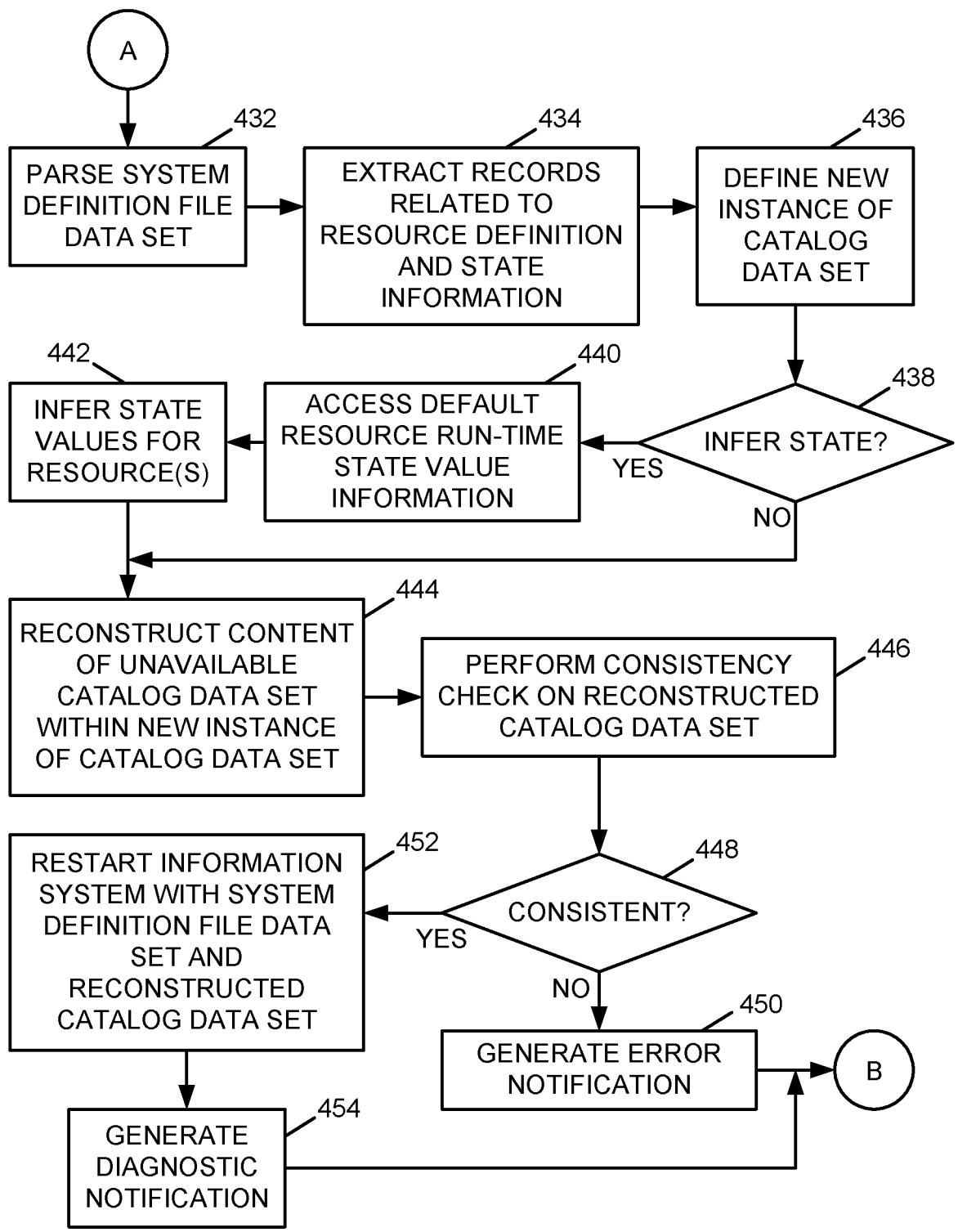
FIG. 4B is a flow chart of an example of an implementation of additional processing within a process for automated reconstruction of system definitional and state information according to an embodiment of the present subject matter.

FIG. 3 through FIG. 4B described below represent example processes that may be executed by devices, such as the core processing module 200, to perform the reconstruction of system definitional and state information associated with the present subject matter. Many other variations on the example processes are possible and all are considered within the scope of the present subject matter. The example processes may be performed by modules, such as the system information reconstruction module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for reconstruction of system definitional and state information. At block 302, the process 300 determines, via a processor, that one of a system definition file data set and a catalog data set used by an information system is unavailable for orderly restart of the information system, where the system definition file data set provides resource definition information and the catalog data set provides resource state information for the information system. At block 304, the process 300 determines that the other of the system definition file data set and the catalog data set is available. At block 306, the process 300 reconstructs the unavailable one of the system definition file data set and the catalog data set by rebuilding the system resource definition and state information used by the unavailable one of the system definition file data set and the catalog data set using system resource information within the other available one of the system definition file data set and the catalog data set.

FIGS. 4A-4B illustrate a flow chart of an example of an implementation of a process 400 for automated reconstruction of system definitional and state information. FIG. 4A illustrates initial processing within the process 400. At decision point 402, the process 400 makes a determination as to whether a restart of an information system is pending. For example, in error or failure associated with an information system may be detected or a user request to restart the information system may be detected. In response to determining that a restart of the information system is pending, the process 400 makes a determination at decision point 404 as to whether both the catalog data set and a system definition file data set are available. As described above, where both the catalog data set and the system definition file data set are available, the information system may be started normally from a state of the last warm restart, as represented within the catalog data set. As such, in response to determining that both the catalog data set and a system definition file data set are available, the process 400 utilizes the respective resource files to restart information system at block 406.

Returning to decision point 404, it should be noted that unavailability of either of the catalog data set or the system definition file data set may be due to corruption of the respective data set, deletion of the respective data set, or other causes for unavailability of the respective data set. In response to determining at decision point 404 that both of the catalog data set and the system definition file data set are not available, the process 400 makes a determination at decision point 408 as to whether either of the catalog data set or the system definition file data set is available. As such, the process 400 makes a determination as to whether at least one uncorrupted data set is available from which to attempt to reconstruct the other unavailable data set. In response to determining that neither data set is available, process 400 generates an error notification at block 410, and returns to decision point 402 and iterates as described above.

Returning to the description of decision point 408, in response to determining that either data set is available, the process 400 makes a determination at decision point 412 as to whether it is the catalog data set that is available (and contemporaneously whether it is the system definition file data set that is available). As such, in response to determining that the catalog data set is the available data set, the process 400 defines a new instance of the system definition file data set, such as a new instance of a CSD, at block 414. At block 416, the process 400 parses the available catalog data set. At block 418, the process 400 extracts records related to resource definition and state information from the parsed catalog data set.

At decision point 420, the process 400 makes a determination as to whether any additional catalog data sets are available for processing. For example, as described above, where a CSD is shared among multiple information system installations, each individual installation of the information system may not have all available system resources installed. However, the set of information system installations may have a set of installed resources that more closely approximates the available system resources within the original CSD. As such, by using multiple catalog data sets for reconstruction of a CSD, there is a higher probability of identifying more resource information than where a single catalog data set is used. Accordingly, a more-comprehensive CSD may be reconstructed by using multiple catalog data sets.

In response to determining at decision point 420 that additional catalog data sets are available for processing, the process 400 returns to block 416 to parse an additional catalog data set and iterates as described above until all available catalog data sets have been parsed and all suitable records have been extracted for reconstruction of a system definition file data set. In response to determining at decision point 420 that no additional catalog data sets are available for processing, the process 400 reconstructs the content of the unavailable system definition file data set within the new instance of the system definition file data set using the extracted records related to resource definition and state information extracted from one or more parsed catalog data sets at block 422.

At block 424, the process 400 performs a consistency check on the reconstructed system definition file data set to ensure compliance of the rebuilt system resource definition and state information for proper restart of the information system. For example, the determination of consistency of the system resource definition and state information may be based upon resource names, length of control blocks, items of state values set to consistent or default values, or other consistency measures as appropriate for a given implementation.

At decision point 426, the process 400 makes a determination as to whether a consistency check indicates that the system resource definition and state information is consistent. In response to determining that the system resource definition and state information is not consistent, the process 400 returns to block 410 to generate an error notification and iterates as described above. In response to determining that the system resource definition and state information is consistent, the process 400 restarts the information system utilizing the reconstructed system definition file data set and the catalog data set of the installed information system at block 428. At block 430, the process 400 generates a diagnostic notification that documents the rebuilt system resource definition and state information associated with the reconstructed system definition file data set. As described above, the diagnostic notification may be utilized by a customer/user to evaluate the restart of the system such that an orderly shut down or other action may be performed as appropriate for a given implementation. The process 400 returns to decision point 402 and iterates as described above.

Returning to the description of decision point 412, in response to determining that the catalog data set is not available and that the system definition file data set is available, the process 400 transitions to the processing shown and described in association with FIG. 4B.

FIG. 4B illustrates additional processing associated with the process 300 for automated reconstruction of system definitional and state information. At block 432, the process 400 parses the system definition file data set. At block 434, the process 400 extracts records related to the resource definition and state information from the parsed system definition file data set. At block 436, the process 400 defines a new instance of the catalog data set.

At decision point 438, the process 400 makes a determination as to whether to infer a state for resources within the catalog data set to be reconstructed. For example, as discussed above, because the catalog data set represents resource states for installed resources at the end of the last warm restart of the information system, inferring a state for one or more installed resources may be performed to select the default operational state for use during a subsequent restart using the reconstructed catalog data set.

In response to determining to infer a state for at least one system resource, the process 400 accesses information that defines default resource run-time state values and value selection decisions for system resources at block 440. At block 442, the process 400 infers state information for at least one system resource based upon the accessed information that defines default resource run-time state values and value selection decisions for system resources.

In response to inferring the state values for one or more system resources at block 442, or in response to determining at decision point 438 not to infer a state for any system resources, the process 400 reconstructs the catalog data set by rebuilding system resource definition and state information used by the catalog data set at block 444. At block 446, the process 400 performs a consistency check on the reconstructed catalog data set to ensure compliance of the rebuilt system resource definition and state information for proper restart of the information system. For example, the determination of consistency of the system resource definition and state information may be based upon resource names, length of control blocks, items of state values set to consistent or default values, or other consistency measures as appropriate for a given implementation.

At decision point 448, the process 400 makes a determination as to whether the consistency check indicates that the system resource definition and state information is consistent. In response to determining that the system resource definition and state information is not consistent, the process 400 generates an error notification at block 450, and returns to processing described in association with FIG. 4A at decision point 402 and iterates as described above. In response to determining that the system resource definition and state information is consistent, the process 400 restarts the information system utilizing the system definition file data set and reconstructed catalog data set at block 452. At block 454, the process 400 generates a diagnostic notification that documents the rebuilt system resource definition and state information associated with the reconstructed catalog data set. As described above, the diagnostic notification may be utilized by a customer/user to evaluate the restart of the system such that an orderly shut down or other action may be performed as appropriate for a given implementation. The process 400 returns to the processing described in association with FIG. 4A at decision point 402 and iterates as described above.

As such, the process 400 performs automated processing to determine whether either of a catalog data set or a system definition file data set is unavailable for use in association with an information system restart. In response to determining that either data set is unavailable and that one of the respective data sets is available, the process 400 reconstructs the respective other data set from the available data set. Accordingly, the process 400 provides for an orderly restart of an information system that has a missing or corrupted data set, where it may not otherwise be able to be restarted. Further, the process 400 provides diagnostics that allow a customer/user to evaluate system issues and perform an orderly shut down of the system, as appropriate for a given implementation.

As described above in association with FIG. 1 through FIG. 4B, the example systems and processes provide reconstruction of system definitional and state information. Many other variations and additional activities associated with reconstruction of system definitional and state information are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining, via a processor, that one of a system definition file data set and a catalog data set is unavailable for orderly restart of an information system, where the system definition file data set provides system resource definition information and the catalog data set provides system resource state information for the information system;
    determining that the other of the system definition file data set and the catalog data set is available; and
    reconstructing the unavailable one of the system definition file data set and the catalog data set by rebuilding the system resource definition and state information used by the unavailable one of the system definition file data set and the catalog data set using system resource information within the other available one of the system definition file data set and the catalog data set, comprising:
  reconstructing the system definition file data set in response to determining that the catalog data set is available, comprising:
    parsing the catalog data set;
    extracting records related to the system resource definition and state information from the parsed catalog data set;
    defining a new instance of the system definition file data set; and
    reconstructing the content of the unavailable system definition file data set within the new instance of the system definition file data set using the records related to the system resource definition and state information extracted from the parsed catalog data set.

2. The method of claim 1, where the system resource definition information comprises resource definitions with initial resource states and the system resource state information comprises state changes of resources from the initial resource states, and further comprising restarting the information system utilizing the reconstructed one of the system definition file data set and the catalog data set.

3. The method of claim 1, further comprising performing a consistency check on the reconstructed one of the system definition file data set and the catalog data set to ensure compliance of the rebuilt system resource definition and state information for proper restart of the information system.

4. The method of claim 1, further comprising generating a diagnostic notification that documents the rebuilt system resource definition and state information.

5. The method of claim 1, where the system definition file data set is used by a plurality of installations of the information system and where reconstructing the system definition file data set in response to determining that the catalog data set is available comprises:
  reconstructing the system definition file data set in response to determining that a plurality of catalog data sets from other of the plurality of installations of the information system are available, and where:
    parsing the catalog data set comprises parsing each of the plurality of catalog data sets;
    extracting the records related to the system resource definition and state information from the parsed catalog data set comprises extracting records related to the system resource definition and state information from each of the parsed plurality of catalog data sets; and
    reconstructing the content of the unavailable system definition file data set within the new instance of the system definition file data set using the records related to the system resource definition and state information extracted from the parsed catalog data set comprises reconstructing the content of the unavailable system definition file data set within the new instance of the system definition file data set using the records related to the system resource definition and state information extracted from the plurality of parsed catalog data sets.

6. A method, comprising:
determining, via a processor, that one of a system definition file data set and a catalog data set is unavailable for orderly restart of an information system, where the system definition file data set provides system resource definition information and the catalog data set provides system resource state information for the information system;
determining that the other of the system definition file data set and the catalog data set is available; and
reconstructing the unavailable one of the system definition file data set and the catalog data set by rebuilding the system resource definition and state information used by the unavailable one of the system definition file data set and the catalog data set using system resource information within the other available one of the system definition file data set and the catalog data set, comprising:
  reconstructing the catalog data set in response to determining that the system definition file data set is available, comprising:
    parsing the system definition file data set;
    extracting records related to the system resource definition and state information from the parsed system definition file data set;
    defining a new instance of the catalog data set; and
    reconstructing the content of the unavailable catalog data set within the new instance of the catalog data set using the records related to the system resource definition and state information extracted from the parsed system definition file data set.

7. The method of claim 6, where reconstructing the content of the unavailable catalog data set within the new instance of the catalog data set using the records related to the system resource definition and state information extracted from the parsed system definition file data set comprises:
  accessing information that defines default system resource run-time state values and value selection decisions for system resources; and
  inferring state information for at least one system resource based upon the accessed information that defines the default system resource run-time state values and value selection decisions for the system resources.

8. A method, comprising:
determining, via a processor, that one of a system definition file data set and a catalog data set is unavailable for orderly restart of an information system, where the system definition file data set provides system resource definition information and the catalog data set provides system resource state information for the information system;
determining that the other of the system definition file data set and the catalog data set is available; and
reconstructing the unavailable one of the system definition file data set and the catalog data set by rebuilding the system resource definition and state information used by the unavailable one of the system definition file data set and the catalog data set using system resource information within the other available one of the system definition file data set and the catalog data set.

9. The method of claim 8, where the system resource definition information comprises resource definitions with initial resource states and the system resource state information comprises state changes of resources from the initial resource states, and further comprising restarting the information system utilizing the reconstructed one of the system definition file data set and the catalog data set.

10. The method of claim 8, further comprising performing a consistency check on the reconstructed one of the system definition file data set and the catalog data set to ensure compliance of the rebuilt system resource definition and state information for proper restart of the information system.

11. The method of claim 8, further comprising generating a diagnostic notification that documents the rebuilt system resource definition and state information.

12. The method of claim 8, where the system definition file data set is used by a plurality of installations of the information system and where reconstructing the unavailable one of the system definition file data set and the catalog data set by rebuilding the system resource definition and state information used by the unavailable one of the system definition file data set and the catalog data set using the system resource information within the other available one of the system definition file data set and the catalog data set comprises:

reconstructing the system definition file data set in response to determining that a plurality of catalog data sets from other of the plurality of installations of the information system are available, comprising:
        parsing each of the plurality of catalog data sets;
        extracting records related to the system resource definition and state information from each of the parsed plurality of catalog data sets;
        defining a new instance of the system definition file data set; and
        reconstructing the content of the unavailable system definition file data set within the new instance of the system definition file data set using the records related to the system resource definition and state information extracted from the plurality of parsed catalog data sets.

\* \* \* \* \*